United States Patent [19]

Sheridan et al.

[11] 3,911,086
[45] Oct. 7, 1975

[54] POTASSIUM AMMONIUM POLYPHOSPHATES

[75] Inventors: Richard C. Sheridan, Sheffield; John F. McCullough, Florence, both of Ala.

[73] Assignee: Tennessee Valley Authority, Muscle Shoals, Ala.

[22] Filed: July 28, 1971

[21] Appl. No.: 166,985

Related U.S. Application Data

[63] Continuation of Ser. No. 112,801, Feb. 4, 1971.

[52] U.S. Cl. .............................. 423/306; 423/315
[51] Int. Cl. .................... C01b 15/16; C01b 25/26
[58] Field of Search...... 23/105, 106 A, 106 R, 107; 71/34, 43; 423/305, 306, 312, 315, 316

[56] References Cited
UNITED STATES PATENTS

| | | | |
|---|---|---|---|
| 3,193,374 | 7/1965 | Gautier et al. | 71/41 |
| 3,244,500 | 4/1966 | Stinson et al. | 71/1 |
| 3,419,349 | 12/1968 | Rohlfs et al. | 23/107 |
| 3,432,261 | 3/1969 | Ewart et al. | 23/107 |
| 3,549,347 | 12/1970 | Lyons et al. | 71/34 |

*Primary Examiner*—Oscar R. Vertiz
*Assistant Examiner*—Gregory A. Heller

[57] ABSTRACT

Long-chain crystalline potassium ammonium polyphosphates with the general formula $K_x(NH_4)_yP_nO_{3n+1}$ where $n$ is greater than about 50, $x + y = n + 2$, and $y/x$ ranges from 0.25 to 4.0 are prepared by thermal condensation of ammonium ortho-, pyro-, tripoly-, tetrapoly-, tetrameta-, or long-chain polyphosphates with potassium orthophosphate, metaphosphate, carbonate, or chloride by heating in an atmosphere or stream of ammonia at temperatures of about 200° C. to 400° C. for a period of 1 to 16 hours.

24 Claims, No Drawings

POTASSIUM AMMONIUM POLYPHOSPHATES

The invention herein described may be manufactured and used by or for the Government for governmental purposes without the payment to us of any royalty therefor.

This application is a continuation of our copending application Ser. No. 112,801, filed Feb. 4, 1971, for Potassium Ammonium Polyphosphates now T892,015.

Our invention relates to an improved process for the preparation of potassium ammonium polyphosphates, and more particularly it relates to a direct method for the preparation of long-chain, substantially waterinsoluble, highly condensed, crystalline potassium ammonium polyphosphates derived from ammonium phosphates and potassium phosphates, as well as from other potassium salts.

Long-chain crystalline potassium ammonium polyphosphates are highanalysis fertilizers with good physical properties containing greater than 90 percent plant nutrients (N + $P_2O_5$ + $K_2O$), e.g., 6-64-23. As a result of their low water solubility, they release nutrients to the plants at low rates, thus serving as slow-release fertilizers. The long-chain crystalline potassium ammonium polyphosphates provided by the present invention have the advantage over most types of slow release fertilizers of containing all three of the primary plant nutrients-nitrogen, phosphorus, and potassium—in a single chemical compound. Some of the advantages of slow release fertilizers over soluble fertilizers are reduced losses of plant nutrients due to leaching, reduced toxicity to seedlings or plants caused by high salt concentrations and reduced luxury consumption of potassium. Consequently, crops can be supplied with enough slow release fertilizer in a single application to supply the required plant nutrients for an entire growing season on longer whereas numerous applications of soluble fertilizer are required.

The prior art shows that long-chain potassium ammonium polyphosphate may be prepared as an impure, amorphous solid by treating potassium metaphosphate with a solution of ammonium chloride, (U.S. Pat. No. 3,432,261, Ewart et al) and as a viscous mass by heating a mixture of highly condensed phosphoric acid containing 87.7 percent $P_2O_5$, ammonia, and potassium hydroxide (German Pat. No. 764,588, H. Rudy et al). The viscous and amorphous materials described in the prior art are difficult to handle, bag, store, and utilize in mechanized application equipment. Also, they cannot be characterized by standard laboratory techniques such as x-ray powder diffraction and chemical microscopy, thereby rendering same somewhat less than desirable as materials useful in laboratory research. It is obvious, therefore, that a method for the preparation of long-chain potassium ammonium polyphosphate in a homogeneous, crystalline form that is easily handled and easily characterized by x-ray powder diffraction and chemical microscopy would represent a significant advance in the art.

Processes for the manufacture of long-chain crystalline potassium ammonium polyphosphate which require the use of urea are also known, U.S. Pat. No. 3,419,349, H. A. Rohlfs et al and German Pat. No. 1,925,068, J. W. Lyons et al. These processes require the use of urea or other similar organic material to serve as a combined condensing and ammoniating agent. The urea serves as a condensing agent by combining chemically with the water released by the reacting system as in the reaction $$CO(NH_2)_2 + H_2O = CO_2 + 2NH_3$$

Urea serves as an ammoniating agent by supplying part or all of the ammonia in the product and in addition supplies the required concentration of ammonia in the vapor phase over products and reactants.

There are certain disadvantages to the use of condensing agents such as urea in the preparation of potassium ammonium polyphosphates. Urea is expensive, it is consumed in the reaction, and it introduces impurities such as cyanuric acid and melamine cyanurate. These impurities are formed as by-products in the decomposition of urea, and they are tedious to remove from the desired polyphosphate product. Therefore, it is apparent that a method for the manufacture of long-chain crystalline potassium ammonium polyphosphate in high yield and high purity without the use of urea or any other nitrogencontaining organic condensing agent would represent a novel and useful improvement in the art.

The processes for manufacture of long-chain crystalline potassium ammonium polyphosphate as described in U.S. Pat. No. 3,419,349, Rohlfs et al, supra, in which $NH_4H_2PO_4$, $KH_2PO_4$, and urea or other nitrogen-containing organic compounds are heated together produce a mixture of ortho-, pyro-, tripoly-, oligo-, and polyphosphates. The yield of long-chain potassium ammonium polyphosphate is only about 11 to 36 percent, and the product must be separated from the shortchain phosphates and other impurities introduced by the urea. Thus, it can be appreciated that a process that produces pure long-chain crystalline potassium ammonium polyphosphate without the use of urea or any other condensing agent is a distinct improvement in the art.

It is known that by heating diammonium orthophosphate to a temperature above 100°C. a part of the ammonia is driven off so that monoammonium orthophosphate is formed. Monoammonium orthophosphate decomposes above 170°C. with loss of water and more ammonia to yield an acidic mixture of short-chain ammonium hydrogen polyphosphates. This mixture is tacky, hygroscopic, plastic, and difficult to handle or store.

It has now been found that friable, nontacky, nonhygroscopic, free-flowing, long-chain crystalline potassium ammonium polyphosphates can be prepared in a simple manner by heating potassium orthophosphates, potassium metaphosphate, potassium carbonate, or potassium chloride with ammonium ortho-, pyro-, tripoly-, tetrapoly-, tetrameta-, long-chain polyphosphate, or mixtures thereof, in a stream of gaseous ammonia without the requirement for any nitrogen-containing organic compound or other reagents to function as condensing agents. For purposes of definition, it should be understood that our reference to long-chain polyphosphates means those materials having the general formula $(NH_4)_{n+2}P_nO_{3n+1}$, where $n$ is greater than 4 and theoretically may approach an infinite value, but in most instances is observed to be about 50. This is accepted in the art and reported in the literature, as for example in L. V. Kubasova and T. D. Pozharskaya, *Russian Journal of Inorganic Chemistry*, 15, 23 (1970).

As being illustrative of some of the foregoing types of reactants which can be used to prepare water-insoluble crystalline potassium ammonium polyphosphate by thermal condensation, the following equations are set forth:

1. $nKH_2PO_4 + nNH_4H_2PO_4 = [KNH_4(PO_3)_2]_n + 2nH_2O$
2. $nKH_2PO_4 + n(NH_4)_2HPO_4 = [KNH_4(PO_3)_2]_n + 2nH_2O + nNH_3$
3. $nKCl + 2nNH_4H_2PO_4 = [KNH_4(PO_3)_2]_n + nNH_4Cl + 2nH_2O$
4. $n/2K_2CO_3 + nNH_4H_2PO_4 = [KNH_4(PO_3)_2]_n + n/2CO_2 + nH_2O$
5. $(KPO_3)_n + nNH_4H_2PO_4 = [KNH_4(PO_3)_2]_n + nH_2O$ it being understood that any of the above listed ammonium phosphates may be substituted for the ammonium orthophosphate and that the product mole ratio K/N is equal to the mole ratio K(P–K) in the starting materials and may range from 0.25 to 4.0. Orthophosphoric acid and polyphosphoric acid may be used as starting materials if they are neutralized with ammonia before or during heating with the potassium salt.

Several new and advantageous features over the existing process for the production of long-chain crystalline potassium ammonium polyphosphates shown in the prior art are realized by the present invention. Among these advantageous features of our new and unique process are (1) it utilizes commercially available raw materials, including ammoniated wet-process phosphoric acid; (2) it produces quantitative yields and the nonorthophosphate $P_2O_5$ content of the product is substantially 100 percent; (3) it obviates the requirement for the use of other materials to serve as condensing agents; (4) it is a simple and convenient method for effecting the production of a composition of matter which is not now available on a commercial basis, but which is highly suitable for use as a high-analysis fertilizer containing the three major plant nutrients, or as a component in mixed fertilizers; (5) it yields a nontacky, friable product that is easily crushed to a freeflowing nonhygroscopic, and noncaking powder; and (6) the composition of the product may be varied over a broad range without altering its basic crystal structure.

It is therefore an object of the present invention to provide an improved process for preparing long-chain crystalline potassium ammonium polyphosphates.

A further object of the present invention is to provide a process for preparing long-chain crystalline potassium ammonium polyphosphates in improved yields.

Still a further object of the present invention is to provide a process for preparing long-chain crystalline potassium ammonium polyphosphates with a mole ratio N/K which may range from 0.25 to 4.0.

Still another object of the present invention is the economical, simple, and direct production of long-chain crystalline potassium ammonium polyphosphates pure enough for both laboratory studies and commercial use, and which process may utilize as raw material commercially available, inexpensive, and well-known chemicals.

According to the process of our invention, an ammonium phosphate is heated with potassium phosphate, potassium carbonate, or potassium chloride at a temperature between 200° and 400° C., and preferably between 225° and 300° C. in a stream or atmosphere of ammonia.

The long-chain crystalline potassium ammonium polyphosphates produced by the process of our invention are high-molecular-weight species with the general formula $K_x(NH_4)_yP_nO_{3n+1}$ where $n$ is greater than about 50, $x + y = n + 2$, and the ratio $y/x$ may range from 0.25 to 4.0 with only minor changes in the x-ray powder diffraction pattern. The x-ray diffraction data for the series are summarized in Table I.

Table I

| X-Ray Powder Diffraction Data for Potassium Ammonium Polyphosphates | | | | | |
|---|---|---|---|---|---|
| Mole/mole P | | Four strongest lines, d, A. | | | |
| K | N | 1 | 2 | 3 | 4 |
| 0.21 | 0.79 | 6.54 | 3.454 | 5.51 | 5.290 |
| 0.34 | 0.66 | 6.46 | 3.448 | 5.43 | 5.255 |
| 0.50 | 0.52 | 6.44 | 3.439 | 5.385 | 5.229 |
| 0.69 | 0.31 | 6.38 | 3.419 | 5.327 | 5.176 |
| 0.80 | 0.19 | 6.34 | 3.408 | 5.302 | 5.137 |

We have found that the mole ratio N/K of the product may range from about 0.25 to about 4.0, and that this ratio depends upon the amount of starting materials. For example, three moles of $KH_2PO_4$ and one mole of $NH_4H_2PO_4$ condense to a product with a mole ratio N/K of 0.33, one mole of $KH_2PO_4$ and one mole of $NH_4H_2PO_4$ yields a product with a mole ratio N/K of 1.0, and one mole of $KH_2PO_4$ and three moles of $NH_4H_2PO_4$ yields a product with a mole ratio N/K of 3.0. The by-products produced in our process depend upon the particular potassium compound used. For example, $KH_2PO_4$ and $NH_4H_2PO_4$ yield only water in addition to the product $K_x(NH_4)_yP_nO_{3n+1}$, but the use of KCl or $K_2CO_3$ causes the formation of ammonium chloride or carbon dioxide, respectively, in addition to water. In the process these by-products are volatilized and expelled from the reactor so that a pure product is obtained. The time of heating employed will range from about 1 hour to about 16 hours, but we have determined that in most cases a good practice of our invention requires a time usually between 3 hours and 8 hours. No advantage is realized in heating any of the various combinations of starting materials much in excess of 16 hours. The temperature of the reactor may range from about 200° to about 400° C., but a preferred range is between about 225° and 300° C.

Our invention, together with objects and advantages thereof, will be better understood from a consideration of the following examples which are to be taken as illustrative only and not by way of limitation.

EXAMPLE I

A mixture of potassium dihydrogen orthophosphate (13.6 grams) and monoammonium dihydrogen orthophosphate (11.5 grams) was heated at 210° C. for 16 hours in a slow stream of ammonia at atmospheric pressure. A homogeneous crystalline product weighing 21.4 grams was obtained with the major x-ray powder diffraction lines at d spacings of 6.54, 3.454, 5.51, and 5.290 A. The product contained 6.3 percent nitrogen, 63.0 percent $P_2O_5$, and 21.8 percent $K_2O$.

EXAMPLE II

A mixture of potassium dihydrogen orthophosphate (27.2 grams) and ammonium tetrametaphosphate (19.4 grams) was heated at 230° C. for 8 hours in a slow stream of ammonia at atmospheric pressure. The homogeneous crystalline product (43.0 grams) contained 6.2 percent nitrogen, 64.4 percent $P_2O_5$, and 22.9 percent $K_2O$.

EXAMPLE III

A mixture of $KH_2PO_4$ (6.8 grams) and crude $NH_4H_2PO_4$ (5.6 grams) prepared by ammoniation of wet-process phosphoric acid was heated at 260° C. for 16 hours in a slow stream of ammonia. X-ray powder diffraction analysis showed that the product (10.6 grams) was long-chain crystalline potassium ammonium polyphosphate.

EXAMPLE IV

A mixture of $KH_2PO_4$ (4.0 grams) and ammoniated superphosphoric acid of fertilizer grade 15-61-0 (4.0 grams) was heated at 260° C. for 8 hours in a slow stream of ammonia. X-ray analysis showed that the product (6.7 grams) was long-chain crystalline potassium ammonium polyphosphate.

EXAMPLE V

A mixture of $KH_2PO_4$ (5.0 grams) and crude ammonium tetrametaphosphate prepared from phosphoric oxide and aqueous ammonia was heated at 260° C. for 16 hours in a slow stream of ammonia. X-ray analysis showed that the product (8.9 grams) was long-chain crystalline potassium ammonium polyphosphate.

EXAMPLE VI

A mixture of $KH_2PO_4$ (1.0 gram) and $(NH_4)_5P_3O_{10}$ (0.9 gram) was heated at 300° C. for 3 hours in a slow stream of ammonia. X-ray analysis showed that the product (1.6 grams) was long-chain crystalline potassium ammonium polyphosphate.

EXAMPLE VII

A mixture of $KH_2PO_4$ (0.5 gram) and $(NH_4)_6P_4O_{13}$ (0.5 gram) was heated at 300° C. for 3 hours in a stream of ammonia. X-ray analysis showed that the product (0.8 gram) was long-chain crystalline potassium ammonium polyphosphate.

EXAMPLE VIII

A mixture of $KH_2PO_4$ (2.3 grams) and long-chain crystalline ammonium polyphosphate, i.e., $(NH_4)_{n+2}P_nO_{3n+1}$ with n about 50 or greater, (1.9 grams) was heated at 270° C. for 16 hours in a slow stream of ammonia. X-ray analysis showed that the product was long-chain crystalline potassium ammonium polyphosphate.

EXAMPLE IX

A mixture of long-chain potassium metaphosphate $(KPO_3)_n$, also known as potassium Kurrol's salt[1] (2.4 grams) and $NH_4H_2PO_4$ (2.3 grams) was heated at 270° C. for 16 hours in a current of ammonia vapor. X-ray analysis showed that the product was long-chain crystalline potassium ammonium polyphosphate.

EXAMPLE X

Mixtures of $KH_2PO_4$ and $(NH_4PO_3)_4$ in different proportions were heated for 16 hours at different temperatures in a stream of ammonia. X-ray analysis showed that the products were long-chain crystalline potassium ammonium polyphosphate. Table II below sets forth the temperatures, amounts charged, and analyses of the products.

Table II

| Charge, grams | | Temp., | Product composition, % | | |
|---|---|---|---|---|---|
| $KH_2PO_4$ | $(NH_4PO_3)_4$ | °C. | N | $P_2O_5$ | $K_2O$ |
| 21.76 | 3.88 | 285 | 2.4 | 62.3 | 33.1 |
| 10.88 | 3.88 | 250 | 3.9 | 63.2 | 29.0 |
| 2.72 | 1.94 | 260 | 6.7 | 64.6 | 21.6 |
| 5.54 | 7.76 | 270 | 8.8 | 67.8 | 15.5 |
| 2.72 | 7.76 | 285 | 10.9 | 70.1 | 9.6 |

[1] Erich Thilo, Advances in Inorganic Chemistry and Radiochemistry, 4, 51 (1962). (Academic Press, New York. $(KPO_3)_n$,—n equal to about 100 to greater than 10,000.

EXAMPLE XI

A mixture of potassium chloride (3.2 grams) and monoammonium dihydrogen orthophosphate (11.5 grams) was heated at 295° C. for 16 hours in a slow stream of ammonia. Ammonium chloride sublimed out of the reactor, and the product (9.6 grams) was identified by x-ray analysis as long-chain crystalline potassium ammonium polyphosphate.

EXAMPLE XII

A mixture of muriate of potash (3.7 grams) and crude $NH_4H_2PO_4$ (11.5 grams) made from wet-process phosphoric acid was heated at 295° C. for 16 hours in a slow stream of ammonia. X-ray analysis of the product showed it was substantially long-chain crystalline potassium ammonium polyphosphate with a small amount of iron or aluminum ammonium pyrophosphate.

EXAMPLE XIII

A mixture of potassium carbonate (1.7 grams) and ammoniated superphosphoric acid (fertilizer grade 15-61-0) (5.9 grams) was heated at 250° C. for 2 hours in a slow stream of ammonia. X-ray analysis showed that the product (5.6 grams) was long-chain crystalline potassium ammonium polyphosphate.

EXAMPLE XIV

A mixture of potassium carbonate (1.7 grams) and tetraammonium pyrophosphate (6.2 grams) was heated at 290° C. for 15 hours in a stream of ammonia. X-ray analysis showed that the product (5.4 grams) was long-chain crystalline potassium ammonium polyphosphate.

EXAMPLE XV

Micronutrients were incorporated in several preparations by heating mixtures of ammoniated superphosphoric acid (fertilizer grade 15-61-0) (6.0 grams) and $KH_2PO_4$ (4.0 grams) with 5 or 10 percent by weight of $MnCO_3$, $CuCO_3.Cu(OH)_2$, $ZnCO_3$, $H_3BO_3$, $FeSO_4.7H_2O$, and $(NH_4)_6Mo_7O_{24}.4H_2O$ at 270° C. for 16 hours in a stream of ammonia. X-ray and optical examination showed that the products were substantially long-chain crystalline potassium ammonium polyphosphates containing very minor amounts of amorphous material.

EXAMPLE XVI

A mixture of $KH_2PO_4$ (1.0 gram) and crude ammonium tetrametaphosphate (1.0 gram) prepared from phosphoric oxide and aqueous ammonia was heated at 265° C. for 3 hours under its own vapor pressure of ammonia in a vented tube. X-ray analysis showed that the product (1.8 grams) was about 75 percent longchain crystalline potassium ammonium polyphosphate and about 25 percent long-chain ammonium polyphosphate.

EXAMPLE XVII

Twelve grams of reagent grade orthophosphoric acid (85 percent $H_3PO_4$) was mixed with 13.6 grams of $KH_2PO_4$ and heated for 16 hours at 285° C. in a stream of gaseous ammonia. The solid product was crushed, washed with water, and dried to yield 10.0 grams of a homogeneous crystalline substance which was identified by x-ray diffraction as potassium ammonium polyphosphate with a mole ratio N/K less than 1.0.

EXAMPLE XVIII

Twelve grams of polyphosphoric acid (82.1 percent $P_2O_5$) was mixed with 13.6 grams of $KH_2PO_4$ and heated for 24 hours at 285° C. in a stream of gaseous ammonia. The washed and dried product weighed 7.8 grams, and x-ray diffraction showed that it was crystalline potassium ammonium polyphosphate with a mole ratio N/K less than 1.0.

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by Letters Patent of the United States is:

1. A process for the manufacture of long-chain crystalline potassium ammonium polyphosphates having the general formula $K_x(NH_4)_yP_nO_{3n+1}$, where $n$ is greater than about 50, where $x + y = n + 2$, and where the ratio $y/x$ ranges from about 0.25 to about 4.0, which process consists of the steps of heating an ammonium phosphate selected from the group consisting of ortho-, pyro-, tripoly-, tetrapoly-, tetrameta-, long-chain polyphosphates, and mixtures thereof, with a potassium salt selected from the group consisting of potassium orthophosphate, metaphosphate, carbonate, chloride, and mixtures thereof, in a stream of ammonia vapor to a temperature between 200° C. and 400° C. for a period of from about 1 hour to about 16 hours.

2. A process according to claim 1 in which the ammonium phosphate is an ammonium salt of orthophosphoric acid.

3. A process according to claim 1 in which the ammonium phosphate is ammoniated wet-process phosphoric acid.

4. A process according to claim 1 in which the ammonium phosphate is an ammonium salt of pyrophosphoric acid.

5. A process according to claim 1 in which the ammonium phosphate is an ammonium salt of tripolyphosphoric acid.

6. A process according to claim 1 in which the ammonium phosphate is an ammonium salt of tetrapolyphosphoric acid.

7. A process according to claim 1 in which the ammonium phosphate is ammonium tetrametaphosphate.

8. A process according to claim 1 in which the ammonium phosphate is a product of the reaction of $P_4O_{10}$ with water and ammonia.

9. A process according to claim 1 in which the ammonium phosphate is ammoniated superphosphoric acid.

10. A process according to claim 1 in which the potassium salt is potassium orthophosphate.

11. A process according to claim 1 in which the potassium salt is long-chain potassium metaphosphate.

12. A process according to claim 1 in which the potassium salt is potassium carbonate.

13. A process according to claim 1 in which the potassium salt is potassium chloride.

14. A process according to claim 1 in which the potassium salt is muriate of potash.

15. A process according to claim 1 in which the reaction is carried out at a temperature in the range from about 210° to about 350° C.

16. A process according to claim 1 in which the reaction is carried out at a temperature in the range from about 225° to about 300° C.

17. A process according to claim 1 in which the reaction is carried out at about atmospheric pressure.

18. A process according to claim 1 in which the period of reaction is about 1 to about 8 hours.

19. A process according to claim 1 in which the product is potassium ammonium polyphosphate containing a mole ratio N/K in the range from about 0.50 to about 2.0.

20. A process according to claim 1 in which the product is cooled to ambient temperature.

21. A process according to claim 7 in which the ammonia atmosphere is provided by the vapor pressure of the ammonium phosphate.

22. A process according to claim 8 in which the ammonia atmosphere is provided by the vapor pressure of the ammonium phosphate.

23. A process according to claim 1 in which 1 to 10 percent of micronutrients are incorporated into the products.

24. A process for the manufacture of long-chain crystalline potassium ammonium polyphosphates having the general formula $K_x(NH_4)_yP_nO_{3n+1}$, where n is greater than about 50, where $x + y = n + 2$, and where the ratio $y/x$ may range from 0.25 to 4.0, which process consists of the steps of heating a phosphoric acid selected from the group consisting of orthophosphoric acid, polyphosphoric acid, and mixtures thereof, with a potassium salt selected from the group consisting of potassium orthophosphate, potassium metaphosphate, potassium carbonate, potassium chloride, and mixtures thereof in a stream of ammonia vapor to a temperature between 200° and 400°C for a period of from about 8 hours to 24 hours.

* * * * *